United States Patent [19]
van Heyningen

[11] 4,060,792
[45] Nov. 29, 1977

[54] HARD CLIPPED BEAM FORMER
[75] Inventor: Arent H. Kits van Heyningen, Newport, R.I.
[73] Assignee: Raytheon Company, Lexington, Mass.
[21] Appl. No.: 696,978
[22] Filed: June 17, 1976
[51] Int. Cl.² ............................................. G01S 3/80
[52] U.S. Cl. .................... 340/6 R; 340/6 S; 343/100 LE; 343/100 SA
[58] Field of Search .................... 340/6 S, 6 R, 5 R; 343/100 LE, 100 SA

[56] References Cited
U.S. PATENT DOCUMENTS

| | | | |
|---|---|---|---|
| 3,309,706 | 3/1967 | Huggins et al. | 343/100 LE |
| 3,803,543 | 4/1974 | Cioccio et al. | 340/6 R |
| 3,810,082 | 5/1974 | Arens | 340/6 R |
| 3,905,009 | 9/1975 | Hughes et al. | 340/6 R |

*Primary Examiner*—Richard A. Farley
*Attorney, Agent, or Firm*—David M. Warren; Joseph D. Pannone; Milton D. Bartlett

[57] ABSTRACT

A cylindrical array of radiating elements or sonar transducers each of which is coupled by a clipping circuit to a multiply tapped shift register for imparting delays to the signals of the elements for forming a beam of radiant energy. Sidelobes on the radiation pattern are reduced by multiplying the signals of the shift registers by weighting factors prior to their summation for forming a beam, clipped signals serving as unitary factors of positive or negative sign in the multiplication.

5 Claims, 5 Drawing Figures

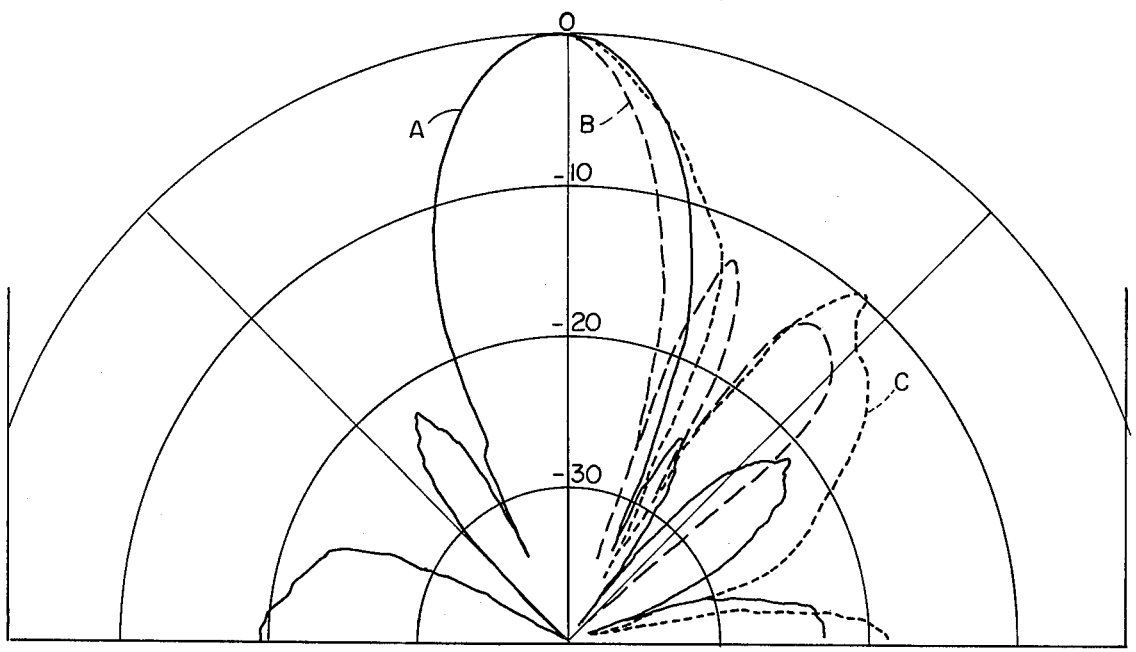
FIG. 5
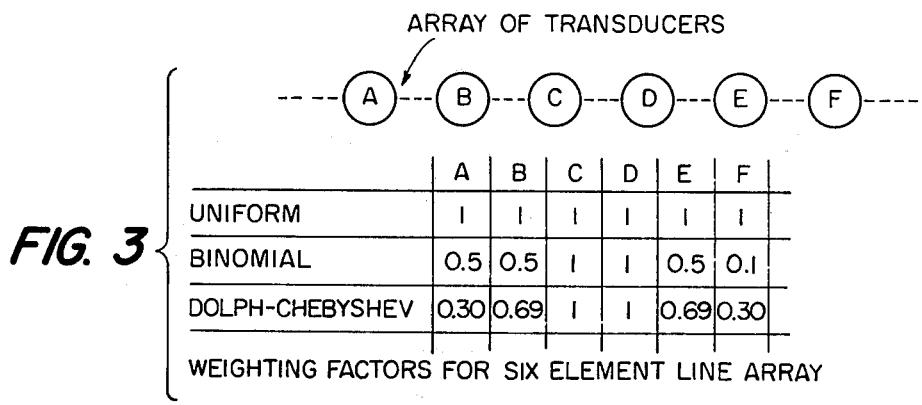
FIG. 3
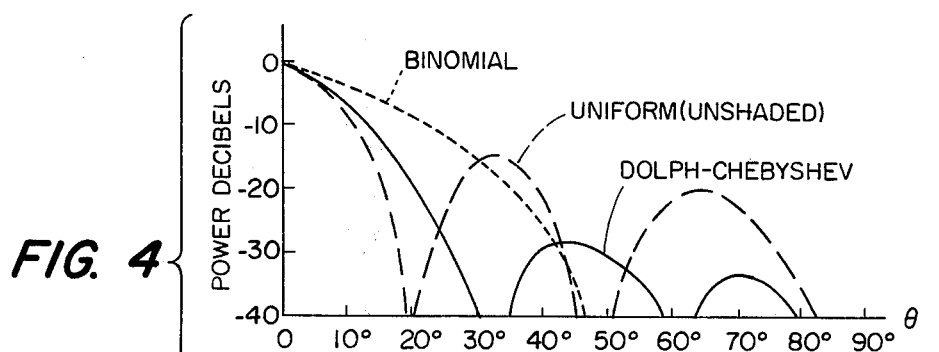
FIG. 4
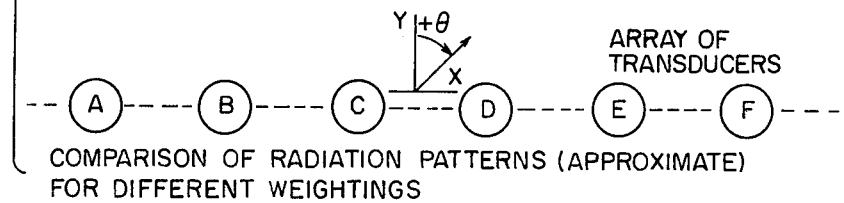

HARD CLIPPED BEAM FORMER

BACKGROUND OF THE INVENTION

This invention relates to circuitry coupled to an array of radiating elements or transducers for combining signals thereof to form beams of radiant energy and, more particularly, to such a beam forming circuit wherein the signals of the radiating elements or transducers are hard limited.

Hard clipping or limiting of signals from radiating elements or transducers arranged in an array is often utilized with beam forming circuits. A hard clipped sinusoidal signal resembles a square or trapezoidal wave signal and has the advantage of rendering the beam forming circuitry substantially insensitive to fluctuations in the amplitude of signals received at the array. The hard clipped signals preserve the zero crossings and phase data of the signals received at the array, the summation of these signals to form a beam being described vectorially as the summation of unitary vectors of differing phases.

A problem arises in that, while the clipped signal beam forming circuitry provides a well-defined main lobe in the radiation pattern of the array, the sidelobes may be excessively large with the result that the receiving circuitry coupled to the beam forming circuitry is responsive to sources of signal at the side of the array when, ideally, such receiving circuitry is to be responsive only to signals positioned in the direction of the main lobe of the radiation pattern.

SUMMARY OF THE INVENTION

The foregoing problem is overcome and other advantages are provided by a beam forming system which, in accordance with the invention, provides for an array of radiating elements which provide signals in response to radiant energy incident thereupon, these signals being processed by a clipping circuit, also known as a limiter circuit, to provide a signal waveform having a substantially trapezoidal or square waveform. The clipped signals are sampled by a sampling system, the samples being obtained at times corresponding to the sequential positions of wavefronts of radiant energy propagating past the array. The samples are one-bit samples. The one-bit samples are multiplied by multibit weighting factors whereupon the resulting products are summed together and filtered by a low pass filter to attenuate spectral components associated with the clipping and sampling operations. The filtered signal is in accordance with a receiving beam radiation pattern of the array having sidelobes of much reduced amplitude as compared to the main lobe of the radiation pattern.

In a preferred embodiment of the invention, the sampling system is implemented by an array of multiply tapped shift registers, one of which is coupled via the clipping circuitry to each of the radiating elements. The preferred embodiment will be described, hereinafter, with respect to a sonar system and, accordingly, sonar transducers will be utilized in lieu of the radiating elements, it being understood that the teachings of the invention are equally applicable to both electromagnetic and sonic radiation systems. The shift registers serve as a storage medium for the clipped transducer signals with sufficient storage being provided to give the past history of sequential positions of a wavefront of sonic energy propagating across the array. The individual taps of the shift registers permit extraction of the samples of individual transducer signals in accordance with the sequential positions of a wavefront relative to the array. There is also disclosed a shift register steering circuit which commutes the weighting factors past the signals of the storage shift registers for rapid scanning in a plane, as the azimuthal plane in the case of a cylindrical array. The scanning is done at a rate above the Nyquist rate, three times the Nyquist rate being typical, for signals received by the array to retain phase information of these signals.

BRIEF DESCRIPTION OF THE DRAWINGS

The aforementioned aspects and other features of the invention are explained in the following description taken in connection with the accompanying drawings wherein:

FIG. 3 is a table of values of weighting factors which may be utilized in the linear array of FIG. 1;

FIG. 4 is a graph of radiation patterns (approximate) of a linear array, such as that of FIG. 1, for the weighting factors of FIG. 3 demonstrating the effect of shading an array; and FIG. 5 is a graph of the radiation pattern for the six-element line array of FIG. 1 having clipped signals and showing the effect of shading by the Dolph-Chebyshev weighting factors, the effect of filtering, and the effect of shading and filtering.

DESCRIPTION OF THE PREFERRED EMBODIMENT

Figure 1:
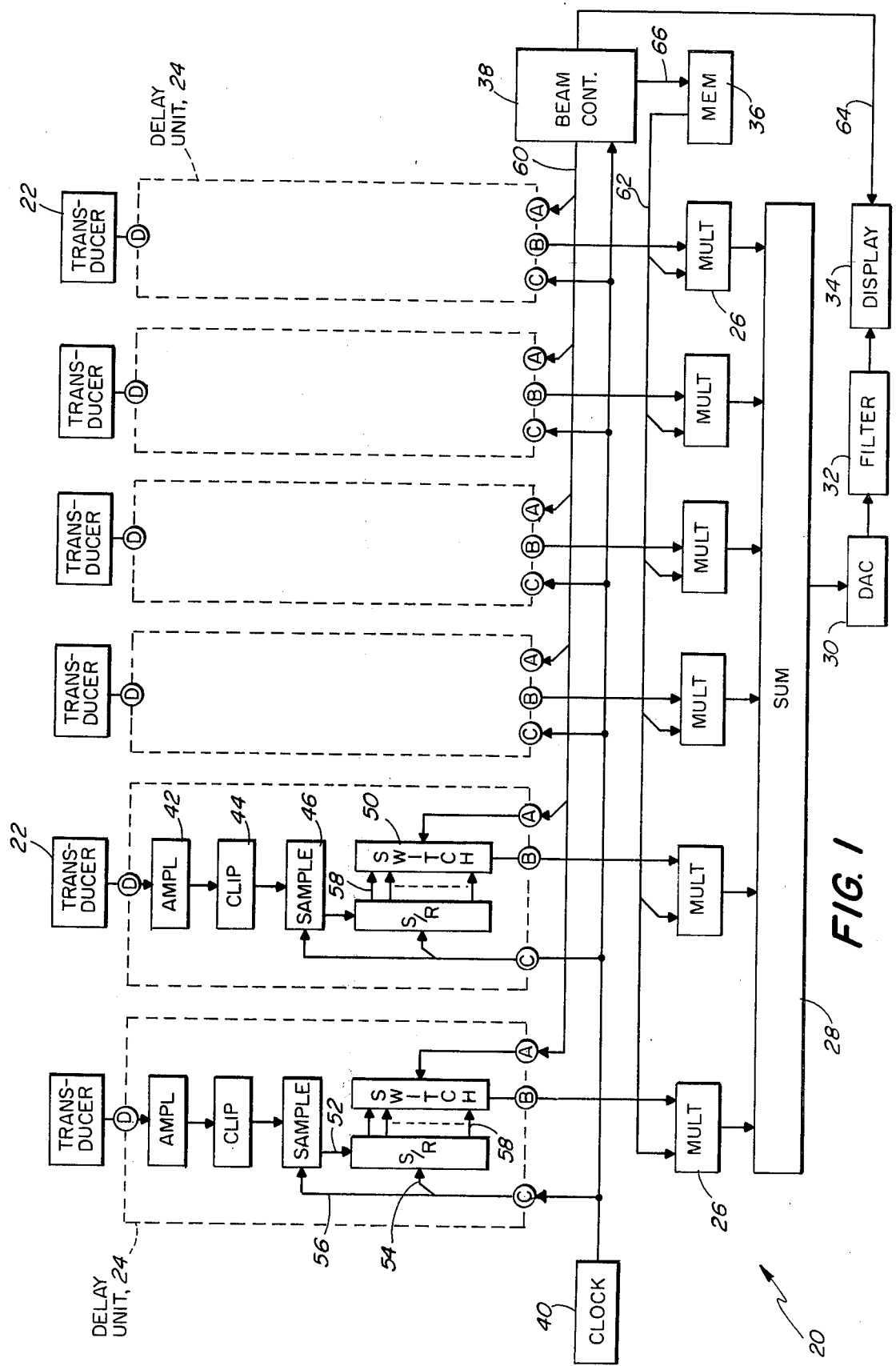
FIG. 1 is a block diagram of a beam forming system of the invention coupled to a linear array of six sonar transducers, the figure including the multipliers of the invention for weighting clipped signals obtained from the transducers.

Referring now to FIG. 1, there is seen a block diagram of a system 20 which, in accordance with the invention, forms a receiving beam pattern for sonic radiation incident upon a linear array of transducers 22, there being six transducers 22 shown in the figure by way of example. Electrical signals produced by each of the transducers 22 in response to sonic energy incident thereupon, are coupled via delay units 24 to multipliers 26, there being one delay unit 24 and one multiplier 26 for each of the transducers 22. Output signals from the multipliers 26 are coupled to a summer 28 wherein the multiplier output signals are summed together, the sum signal produced by the summer 28 being coupled to a digital-to-analog converter hereinafter referred to as DAC 30, an output signal of the DAC 30 being coupled via a low pass filter 32 to a display 34. If desired, the sum signal of the summer 28 may be coupled directly to a digital filter (not shown) for digital signal processing including the low pass filtering of the filter 32. Thereafter the filtered digital signal may be coupled via the DAC 30 to the display 24 or may be returned in digital format to be presented on a digital display. The system 20 further comprises a memory 36 for storing weighting coefficients to be used as multiplying factors by the multipliers 26, a beam controller 38 for providing control signals to the memory 36, to the delay units 24 and to the display 34 and a clock 40 for providing timing signals for synchronizing the operations of the delay units 24 and the beam controller 38.

Each delay unit 24 comprises a preamplifier 42, a clipper 44, a sampler 46, a multiply tapped shift register 48, and a selector switch 50. In each delay unit 24, the preamplifier 42 is coupled via terminal D to a transducer 22 for amplifying the signal thereof to a suitable amplitude for operating the clipper 44. The clipper 44, also known as a limiting circuit, clips or limits the amplitude of the signal coupled thereto from the preamplifier 42. While the input signal to the clipper 44 has the waveform of a sinusoid, the output signal of the clipper 44 has the waveform of a trapezoid which closely approximates a square wave, this close approximation being due to the fact that the clipping level of the clipper 44 is far below the peak amplitude of the sinusoidal waveform, typically less than a few percent thereof, and is frequently referred to as hard clipping or as zero axis crossing detection.

The sampler 46 is responsive to clock signals coupled thereto via terminal C from the clock 40, and provides a sample of the clipped signal of the clipper 44 to the shift register 48 when triggered by a clock pulse from terminal C. The use of the clipper 44 preserves the zero crossings of the sinusoidal signals of the preamplifier 42, the clipped signals having an amplitude which is invariant to changes in the amplitude of the sinusoidal signal. The preamplifier 42 includes a bandpass filter for excluding noise in the spectral region outside the bandpass of the filter, such noise being, for example, sea noise generated by the ocean in which the transducers 22 are immersed. Thus, the output signals from the sampler 46 on line 52 are a succession of relatively high voltage pulse signals, each representing a logic state of 1, followed by a succession of relatively low amplitude pulse signals, each representing a logic state of 0, there being, typically, several or more such pulses on line 52 for each period of the clipped signal of the clipper 44. For example, if there be four 1's followed by four 0's, this being four pulses on line 52 representing logic states of 1 followed by four pulses representing logic states of 0, within each period of the clipped signal, then phase differences between signals of the successive transducers 22 produced in response to an incident wavefront of radiation are quantized to within 45°. The speed of the clock 40 may be adjusted to provide a desired number of samples per period of the clipped signal.

The pulses on line 52 are entered into and sequentially shifted along the shift register 48 in response to clock pulses coupled thereto via terminal C from the clock 40. The clock pulses to the shit register 48 are provided via line 54 which is seen to fan into line 56 providing the clock pulses to the sampler 46. As the shift register 48 fills up with pulses from line 52, a history of the waveform incident upon the transducer 22 is built up within the shift register 48. The shift register 48 is of sufficient length to store data over an interval of time equal to the time required for a wavefront of radiation to propagate along the array of transducers 22 from the first transducer 22 to the last one thereof. If desired, other forms of storage may be utilized such as a random access memory. Thus, there is sufficient storage within the shift register 48 to accommodate an end-fire radiation pattern. In the event that only a broadside beam pattern is desired, the sampler 46, the shift register 48 and the switch 50 may be deleted, the clipped signal being fed directly from the clipper 44 to its corresponding multiplier 26; since the clipped signal is in the form of a square wave, it may be utilized directly as a one-bit digital signal in the multiplication operation.

The shift register 48 has a plurality of taps represented by the lines 58, one line 58 being coupled to each cell of the shift register 48 for coupling the stored pulse within that cell to the selector switch 50. In accordance with a digital number presented at terminal A by the beam controller 38, the switch 50 selects one of the lines 58 for coupling the pulse thereon via terminal B to the corresponding multiplier 26. It is noted that line 60 from the beam controller 38 carries six separate switch command signals and fans out to the terminals A in respective ones of the delay units 24 for individually activating the switches 50. The switches 50 select the lines 58 to extract samples from the shift registers 48 corresponding to the times of incidence of a wavefront of radiation upon the transducers 22, thereby forming a receiving radiation beam pattern. Such a beam pattern has a well-formed main lobe, and also has side-lobes which are of sufficiently high amplitude to receive signals emanating in the ocean in a direction off the side of the main lobe, the amplitudes of the sidelobes having been increased by virtue of the clipping of the signals by the clipper 44.

In accordance with the invention, the amplitudes of the sidelobes are reduced by multiplying the signals provided by the switches 50 at terminal B in each of the delay units 24 by weighting factors, individual weighting factors being provided for individual ones of the delay units 24 and transducers 22. Line 62 from the memory 36 is seen to fan out into individual ones of the multipliers 26 for providing the weighting factors to the respective ones of the multipliers 26. Specific values of the weighting factors will be described subsequently with reference to FIG. 3. A feature of the invention is the relative simplicity by which the multiplication operation of each multiplier 26 is accomplished. It is noted that the signals at the various terminals B are one-bit signals, each of which has a value of 1 or 0. The weighting factors on line 62 are represented by multi-digit digital numbers. Thus, the multiplication via multiplier 26 is accomplished simply by assigning a positive sign to the weighting factor when the signal at terminal B has a value of 1 and assigning a negative sign to the weighting factor when the signal at terminal B has a value of 0. In other words, a signal at terminal B simply serves as a sign bit to a weighting factor of line 62. The summer 28 then sums together the output signals of the multiplier 26 taking into account the positive and negative signs of the multiplier output signals.

The output signal of the summer 28 is a digital number which is then converted to an analog signal via DAC 30. The output analog signal of the DAC 30 will be described subsequently with reference to a graph in FIG. 4. The analog signal appearing at the output of DAC 30 is in the form of a succession of pulses of varying amplitudes, each amplitude corresponding to the magnitude of the digital number appearing at the output of the summer 28, there being one such digital number provided in response to each pulse provided by the clock 40 on line 56 to the samplers 46 in each of the delay units 24. The low pass filter 32 has a cut-off frequency sufficiently low so as to attenuate the spectral lines associated with the sampling frequency in the output signal of the DAC 30 whereby a continuous waveform analog signal appears at the output of the filter 32. The signal produced by the filter 32 will be described subsequently with reference to a graph of FIG. 4.

The display 34 may be in the form of a cathode ray tube in which deflection voltages are coupled thereto via line 64 from the beam controller 38, the deflection voltages corresponding to the orientation of a receiving beam generated by the system 20. Thus, the amplitude of signals received in a specific beam direction, as provided by the filter 32, are displayed in their proper positions on the display 34. The beam controller 38 may be manually operated to direct a receiving beam in a predetermined direction, or may be preprogrammed to generate a sequence of beams in prescribed directions, the beam controlled providing the switch control signals on line 60 and the memory control signals on line 66 to provide, respectively, the requisite delays and weighting factors to signals received by each of the transducers 22.

Figure 2:
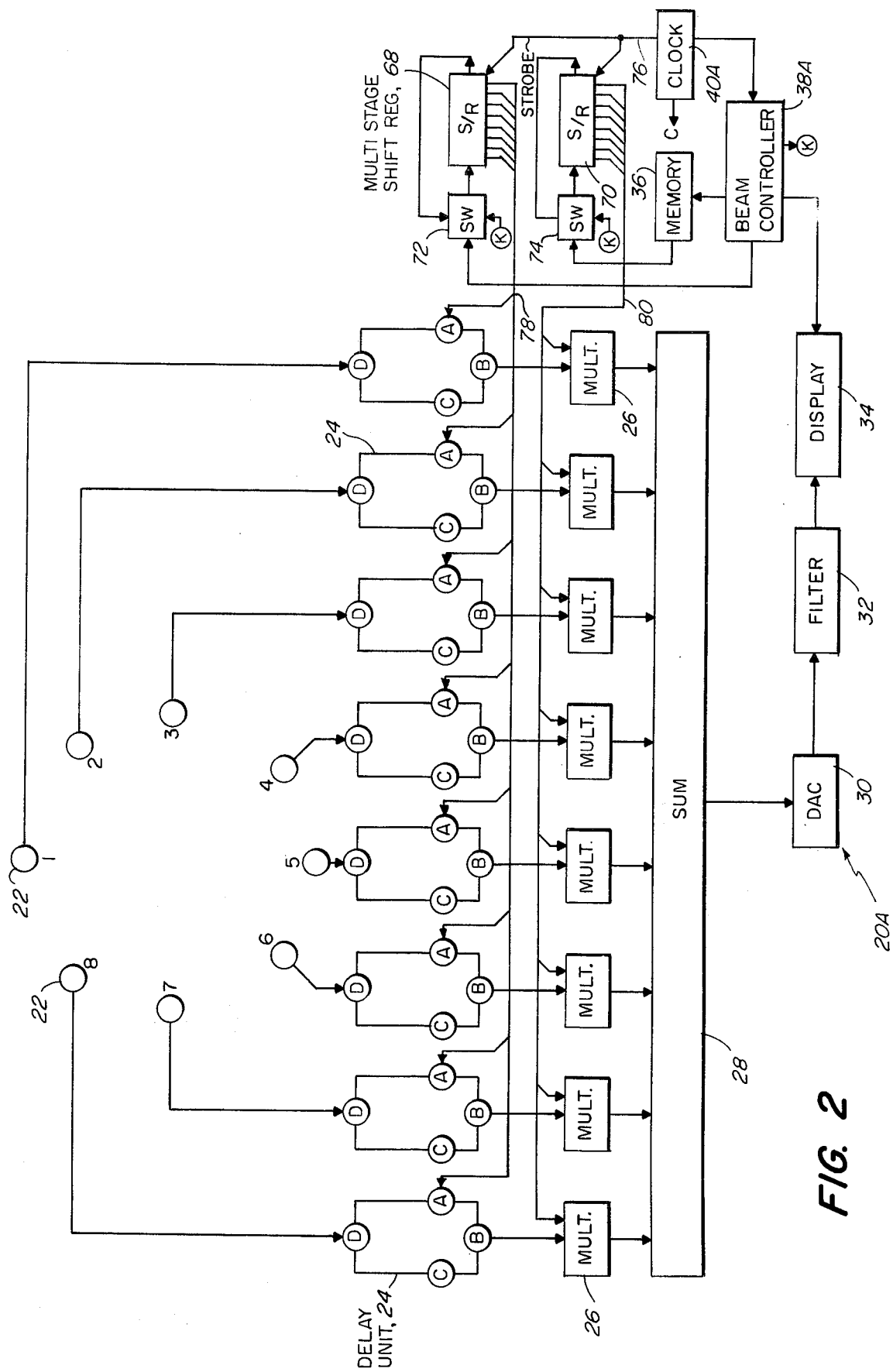
FIG. 2 shows a beam forming system in accordance with the invention coupled to a circular array of eight transducers, FIG. 2 further showing recirculating shift registers for commuting delayed commands and weighting factors among the transducers for rotating a receiving beam of sonic energy.

Referring now to FIG. 2, there is seen a block diagram of an alternative embodiment of the invention to be referred to as system 20A. The system 20A comprises the transducers 22, the delay units 24, the multipliers 26, the summer 28, the DAC 30, the filter 32, the display 34, and the memory 36 previously seen in FIG. 1. The transducers 22 are arranged in a circular array, there being eight transducers 22 in the system 20A. There are eight delay units 24 and eight multipliers 26 corresponding to each of the eight transducers 22. The signals of the individual transducers 22 are coupled via the delay units 24 to the multipliers 26, whereupon they are weighted and summed together via the summer 28 and converted to a filtered analog signal via the DAC 30 and the filter 32 as was taught previously with reference to FIG. 1.

The system 20A is configured to provide a rapidly rotating receiving beam in a manner which utilizes the circular symmetry of the array of transducers 22. It is presumed that the array of the system 20A is utilized to produce eight beams having their maximum response axes directed between the first and second of the transducers 22, the second and third of the transducers 22 and so on at increments of 45° angles for a total of eight beams, individual ones of the transducers 22 being numbered 1-8 in the figure. In view of the fact that the delay units 24 store the complete history of a traversal of a wavefront of radiation across the array of transducers 22, it is apparent that individual beams can be formed by operating the switches 50 of the delay units 24 at any desired rate to form individual beams looking in various directions at any desired rate, even at rates higher than the sampling frequency of the samplers 46 of the delay units 24. For example, if samples are provided at a 100 kHz rate by the samplers 46, the data in the shift registers 48 of the delay units 24 remain unchanged during a 10 microsecond interval. By operating the switches 50 at a rate of approximately 1 MHz, one beam sample for each of the eight beams can be generated during that 10 microsecond interval. Accordingly, with respect to the sampling frequency of the samplers 46, the system 20A may be regarded as simultaneously producing beam samples for eight separate receiving beams, since all eight beams are generated for each input sample. To generate all eight beams in a truly simultaneous fashion would require eight sets of the multipliers 26 rather than the single set of eight multipliers shown in FIG. 2; however, the output signals displayed on the display 34 would be indistinguishable from those obtained with the single set of the multipliers 26 since, in either case, the same eight beams are generated for each sample of the samplers 46.

A rapid commuting of the control signals at terminal A of the delay units 24 and of the multiplying factors to the multipliers 26 for sequentially producing the samples of the aforementioned eight beams or a subset thereof is obtained by means of multi-stage shift registers 68 and 70, switches 72 and 74, and a beam controller 38A which are synchronized via a clock 40A. If desired, a storage media other than the shift registers 68 and 70, such as a random access memory, may be utilized. In operation, the beam controller 38A addresses weighting factors from the memory 36 to be passed via switch 74 into the shift register 70. The shift register 70, being a multi-stage shift register, has the form of several shift registers with their cells arranged in parallel configuration for storing the several digits in the weighting factors. Thus, eight multidigit weighting factors are strobed into the shift register 70 in response to strobe signals on line 76 from the clock 40A. The beam controller 38A and the clock 40A function in a manner analogous to the beam controller 38 and clock 40 of FIG. 1, but, additionally provide the signals for operating the switches 72 and 74 and the shift registers 68 and 70. Thus, in a manner analogous to the loading of the shift register 70, the beam controller 38A also provides a set of control signals for the switches 50 in each of the delay units 24 by loading the multidigit switch control signals into the shift register 68 via the switch 72, these control signals being strobed into the shift register 68 via the strobe signals on line 76. After the shift registers 68 and 70 are loaded, the beam controller via a signal at terminal K, operates the switches 72 and 74 to couple the output signals, respectively, of the shift registers 68 and 70 to the input terminals thereof. Thus, in response to successive strobings of the shift registers 68 and 70 by the clock 40A, the multidigit numbers representing the delays to be selected by each of the switches 50 in delay units 24 as well as the weighting factors to be applied by each of the multipliers 26 are commuted past the output taps of the respective shift registers 68 and 70. The output taps of the shift register 68 fan into line 78 whereupon they fan out into the terminals A in the respective delay units 24. The output taps of the shift register 70 are seen to fan into line 80 whereupon they fan out into the respective ones of the multipliers 26. In this way, the delays and weighting factors are commuted about the signals of the array of transducers 22 for rapidly forming individual ones of the eight beams sequentially in an iterated manner.

Referring now to FIGS. 3, 4 and 5, there are seen, respectively, a table of weighting factors for shading an array such as the array of FIG. 1, a set of radiation patterns for comparing the effects of the different weighting factors, and a graph in polar coordinates showing the radiation of the six-element array of FIG. 1 with a Dolph-Chebyshev weighting both with and without filtering by the filter 32 and the pattern obtained with a uniform weighting. The choice of weighting factors is explained in a book entitled *Principles of Underwater Sound For Engineers* by R. J. Urick, published by McGraw-Hill Book Company in 1967, particularly with reference to FIG. 3, 10 and the accompanying textual material. Also, two articles in the *Journal of the Acoustical Society of America*, referred to by Urick are useful in the selection of weighting factors, namely, Vol. 24 at page 50 et seq. (1952) "The Design of Optimum of Directional Acoustic Arrays" by N. Davids et al., and in Vol. 25 at page 879 et seq. (1953)

"Optimum Directivity Patterns for Linear Point Arrays" by R. L. Pritchard.

The weighting factors shown in the table of FIG. 3 relate to a uniform or unshaded array, a binominal weighting and a Dolph-Chebyshev weighting which are shown respectively in the three rows of the table. The array of transducers labeled A-F pertain to the six transducers 22 of FIG. 1 with the columns designating the numerical values of the weighting factors coupled via line 62 to the multipliers 26 of the signals of the respective transducers 22 of FIG. 1. In FIG. 4, the results of a uniform weighting are shown approximately by the dashed curve which represents the radiation pattern of a six-element array in terms of the angle or broadside, this angle represented by $\theta$ in the figure. The results of a binomial weighting are shown approximately by the dotted curve and the results of the Dolph-Chebyshev weighting are shown approximately by the solid curve. In particular, it is noted that the uniform weighting introduces the usual grating lobes and grating nulls, the binomial weighting introduces a single lobe of intermediate width while the Dolph-Chebyshev introduces a relatively narrow main lobe with side lobes of reduced amplitude. The weighting factors for the circular array of FIG. 2 are altered slightly from those given in the table of FIG. 3 to compensate for the displacements of the transducers 22 from a center line of the array. The interelement spacing between the elements of the array is typically on the order of one-half wavelength of the radiation incident upon the array. A choice of radiation patterns is made available by appropriate selection of the weighting factors.

With respect to FIGS. 1 and 5, the graphs labeled A and B represent respectively the outputs of the filter 32 for the case of Dolph-Chebyshev weighting and the case of uniform weighting which produces an unshaded pattern. Curve C represents the radiation pattern as seen by observing the signal at the input to the filter 32 for the case of Dolph-Chebyshev weighting.

While the prior art, as taught in the aforementioned book by Urick, deals with the weighting applied to the amplitude of signals received by the receiving elements or transducers of an array, it is noted that this invention teaches the equalization of the various signal amplitudes by the clippers 44 so that no distinction can be made between the signals of the various transducers 22 on the basis of amplitude. The clipped signals of the various transducers 22 are distinguishable only by differences in their relative phases resulting from the times of incidence of an incoming wavefront upon the array of transducers 22. Upon the multiplication by the weighting factors by the multipliers 26, the resulting products have the same amplitudes as do the respective weighting factors, the signs of these products differing in accordance with the relative differences in phase of the signals of the various transducers 22. The resulting signal when summed together by the summer 28 and converted to an analog signal by the DAC 30 contains spectral lines falling outside the bandwidth of the signal, the spectral lines resulting from the sampling by the samplers 52. The radiation pattern as observed via the signal at the output of the DAC 30 is shown by the aforementioned graph C of FIG. 5. It is noted that graph C has undesirably large side lobes which side lobes are reduced by the filtering of the filter 32. The improvement in the side lobes by the filtering of the filter 32 is believed to be due to the removal of the foregoing spectral lines from outside the passband of the signal. It is noted that the use of the system 20 of FIG. 1 has provided a radiation pattern having directional characteristics and side lobe characteristics which equal or surpass those obtained by beam forming systems of the prior art in which the signals of the various transducers are customarily processed by matched gain amplifiers having automatic gain control, all of which adds considerable complexity to the circuitry and which is not necessitated by the system 20.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A beam forming system coupled to individual elements of an array of radiating elements, the beam forming system comprising:
    means coupled to individual ones of said radiating elements for clipping signals produced by said radiating elements in response to radiation incident thereupon;
    means for weighting said clipped signals, individual ones of said clipping signals from individual ones of said radiating elements being multiplied by individual weighting factors, the magnitude of a weighting factor being dependent on the position of the corresponding one of said radiating elements relative to the orientation of a beam to be formed by said beam forming system, said weighting being accomplished by affixing a sign to weighting factors of said weighting means, said sign depending on the relative phases of signals incident upon said radiating elements of said array;
    means coupled to said weighting means for summing together the weighted values of said signals; and
    means coupled to said summing means for filtering the sum of the weighted clipped signals, said filtering means including a low pass filter for providing a continuous analog waveform.

2. A system according to claim 1 further comprising means coupled to said weighting means for commuting said weighting factors among the clipped signals of respective ones of said radiating elements.

3. A system according to claim 1 wherein said low pass filter has a passband equal to the bandwidth of a signal received by said array.

4. A beam forming system for combining signals of individual elements of an array of radiating elements, the beam forming system comprising:
    means coupled to individual ones of said radiating elements for equalizing the amplitudes of signals produced by individual ones of said radiating elements in response to radiation incident thereupon;
    means for weighting individual ones of said signals having equal amplitudes to provide weighted signals, the magnitude of the weighting being dependent on the position of the corresponding one of said radiating elements for each of said equal amplitude signals relative to said array, said weighting being accomplished be affixing a sign to weighting factors of said weighting means, said sign depending on the relative phases of signals incident upon said radiating elements of said array; and
    means coupled to said weighting means for providing a filtered summation of said weighting signals, the bandwidth of said filtered summation being equal to the bandwidth of one of said signals of said radiating elements.

5. A system according to claim 4 wherein said signal equalizing means includes means for sampling said signals.

* * * * *